(12) United States Patent
Renno

(10) Patent No.: US 8,051,263 B2
(45) Date of Patent: Nov. 1, 2011

(54) CONFIGURABLE MEMORY PROTECTION

(75) Inventor: Erik Knutsen Renno, Trondheim (NO)

(73) Assignee: Atmel Corporation, San Jose, CA (US)

( * ) Notice: Subject to any disclaimer, the term of this patent is extended or adjusted under 35 U.S.C. 154(b) by 625 days.

(21) Appl. No.: 11/744,573

(22) Filed: May 4, 2007

(65) Prior Publication Data

US 2008/0276051 A1 Nov. 6, 2008

(51) Int. Cl.
*G06F 12/00* (2006.01)
(52) U.S. Cl. ......... 711/163; 711/154; 711/173; 707/781
(58) Field of Classification Search .................. 711/163, 711/173, 154; 707/781
See application file for complete search history.

(56) References Cited

U.S. PATENT DOCUMENTS

| | | | |
|---|---|---|---|
| 5,325,499 A | | 6/1994 | Kummer |
| 5,649,159 A * | | 7/1997 | Le et al. ........................ 711/163 |
| 6,021,476 A * | | 2/2000 | Segars ........................... 711/163 |
| 6,484,227 B1 | | 11/2002 | Mergard et al. |
| 6,519,690 B1 * | | 2/2003 | Quimby ........................ 711/202 |
| 6,697,276 B1 | | 2/2004 | Pereira et al. |
| 6,901,505 B2 | | 5/2005 | McGrath |
| 6,904,504 B2 * | | 6/2005 | Kahn et al. ................... 711/163 |
| 7,068,545 B1 * | | 6/2006 | Kimelman et al. ....... 365/189.16 |
| 2003/0101322 A1 | | 5/2003 | Gardner |
| 2005/0268058 A1 * | | 12/2005 | Drasnin et al. ................ 711/163 |
| 2007/0011419 A1 * | | 1/2007 | Conti ............................ 711/163 |
| 2007/0250675 A1 * | | 10/2007 | Ono et al. ..................... 711/163 |

FOREIGN PATENT DOCUMENTS

WO WO 2004/046934 6/2004

OTHER PUBLICATIONS

"AVR101: High Endurance EEPROM", ARM1156T2F-S Technical Reference Manual Rev.RUpl, ARM Ltd., <www.arm.com/pdfs/DDI0290C_arm1156t2fs_r0p0_trm.pdf>, Chapter 3 pp. 61-60 and Chapter 5 p. 7.*
"Introduction to the Cortex-M3 Processor," white paper available at http://www.arm.com/pdfs/IntroToCortex-M3.pdf, 17 pages, Oct. 2006.
ARM Cortex-M3 Datasheet, available at http://www.arm.com/pdfs/Cortex_M3_DS.pdf, 4 pages, Jan. 2003.
TMS470R1x System Module Reference Guide, available at http://focus.ti.com/lit/ug/spnu189h/spnu189h.pdf, 132 pages, Nov. 2004.
International Search Report & Written Opinion, PCT/US/2008/061175, mailed Jul. 30, 2008, 12 pages.

* cited by examiner

*Primary Examiner* — Matthew Bradley
(74) *Attorney, Agent, or Firm* — Fish & Richardson P.C.

(57) ABSTRACT

A method can include receiving a signal associated with an attempted access to data that is stored at a specific location in memory; obtaining a selection value that selects which memory protection register of multiple alternative memory protection registers is to provide a memory protection attribute for the specific location in memory; obtaining, from the selected memory protection register, a memory protection attribute; and controlling access to the specific location in memory based on the obtained memory protection attribute.

12 Claims, 6 Drawing Sheets

| Cacheable Bufferable Read/Write 502 | Not cacheable Bufferable Read 504 | Not cacheable Not bufferable Read/Write 506 | Cacheable Not Bufferable Read/Write/Execute 508 |

| Not cacheable Bufferable Read/Write/Execute 510 | Cacheable Not bufferable Read 512 | Not cacheable Not bufferable Read/Write 514 | Cacheable Bufferable Read/Write 516 |

CONFIGURABLE MEMORY PROTECTION

TECHNICAL FIELD

This document relates generally to electrical circuits.

BACKGROUND

In processor-based systems that execute program instructions that process data, where either or both of instructions and data are stored in memory, it can be advantageous to control memory access. Controlling memory access may prevent data or instructions from being corrupted or inadvertently overwritten by poorly written or malicious program code. For example, a portion of memory may be dedicated to an operating system, and that portion of memory may only be accessible to a processor when the processor is operating in a supervisor mode to prevent malicious code from corrupting the operating system. As another example, some portions of memory may be designated as either cacheable or not cacheable, and other portions of memory may be designated as bufferable or not bufferable. Access to these designated portions of memory may also be controlled to prevent unexpected results.

SUMMARY

In some implementations, a method includes receiving a signal associated with an attempted access to data that is stored at a specific location in memory; obtaining a selection value that selects which memory protection register of multiple alternative memory protection registers is to provide a memory protection attribute for the specific location in memory; obtaining, from the selected memory protection register, a memory protection attribute; and controlling access to the specific location in memory based on the obtained memory protection attribute.

The method can further include determining a region and a sub-region associated with the specific location in memory. Determining the region associated with the specific location in memory can include comparing an address associated with the specific location to address values stored in one or more address registers. Determining the region associated with the specific location in memory can include comparing an address associated with the specific location to size values stored in the one or more address registers. Determining the sub-region associated with the specific location in memory can include selecting a sub-region from a plurality of sub-regions in a determined region based on the address associated with the specific location and a size of the determined region.

Obtaining the selection value can include determining a specific portion of a selection register from which to obtain the selection value based on a determined sub-region. The obtained memory protection attribute can specify whether contents of the specific location in memory are to be bufferable. The obtained memory protection attribute can specify whether contents of the specific location in memory are to be cacheable. The obtained memory protection attribute can specify whether contents of the specific location in memory are to be accessible to an execution unit in its current mode of operation, wherein the current mode of operation is selected from the group consisting of a non-privileged mode of operation and a privileged mode of operation. Specifying whether contents of the specific location in memory are to be accessible can include specifying whether contents of the location in memory can be read from, written to or executed.

In some implementations, a method of controlling access to memory can include receiving a request for access to data that is stored at a specific location in memory; obtaining a selection value that selects which memory protection register of multiple alternative memory protection registers is to provide a memory protection attribute for the specific location in memory; obtaining, from the selected memory protection register, a memory protection attribute; and granting the request for access when the obtained memory protection attribute indicates that access is to be granted, and denying the request for access when the obtained memory attribute indicates that access is to be denied. The method can further include receiving a parameter that identifies a type of access requested.

In some implementations, an embedded device includes, within a single device package, an execution unit configurable to execute program instructions; one or more memories that are configurable to store data and program instructions to be executed by the execution unit; and a memory protection unit that is configurable to receive a signal from the execution unit requesting access to a specific location in the one or more memories. In some implementations, the memory protection unit includes two or more alternative memory parameter registers and a parameter selection register. The memory parameter selection register can be configurable to provide a value that causes one of the two or more alternative memory parameter registers to be selected, and the memory protection unit can be configurable to control access to the specific location based on one or more values stored in the selected one of the two or more alternative memory parameter registers.

In some implementations, controlling access includes selectively granting or denying the request for access. In some implementations, controlling access includes selectively enabling or disabling buffering of contents of the specific location in the one or more memories. In some implementations, controlling access includes selectively enabling or disabling caching of contents of the specific location in the one or more memories. In some implementations, controlling access includes selectively allowing the execution unit to access the specific location or issuing an exception to the execution unit that prevents the execution unit from accessing the specific location.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

In some implementations, a device can include a memory protection unit that facilitates protection of individual portions of corresponding memory. Some memory protection units can support the configuration of various regions and sub-regions within an overall memory map, where each region or sub-region can have its own memory protection attributes (e.g., attributes that determine whether memory in the corresponding region or sub-region is cacheable, bufferable or accessible for one or more of reading, writing or executing).

In some implementations, as is described in greater detail throughout this document, multiple alternative sets of memory protection attributes can be configured and selectively applied to each region or sub-region. In particular, for example, in some implementations, each region can correspond to both a first alternative set of memory protection attributes and a second alternative set of memory protection attributes, and the memory protection unit can dynamically select (e.g., when a memory access is initiated) either memory protection attributes from the first alternative set or memory protection attributes from the second alternative set in determining whether to allow or inhibit the memory access. In other implementations, more than two sets of alternative memory protection attributes may be available. For example, some implementations include three, four, eight, or some other number of sets of alternative memory protection attributes.

Figure 1:
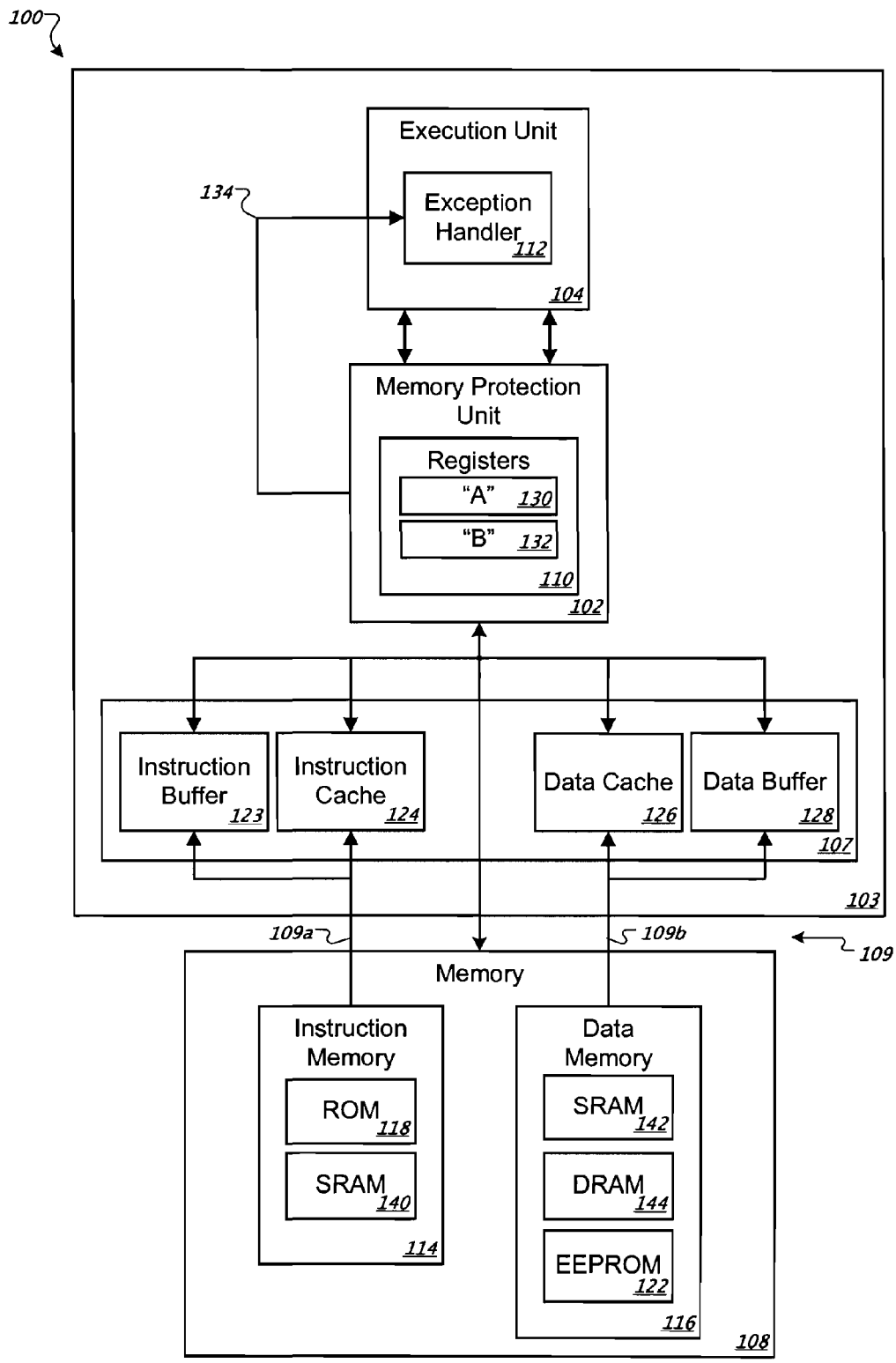
FIG. 1 is a block diagram of an example system that includes a memory protection unit that provides multiple alternative sets of memory protection attributes.

FIG. 1 is a block diagram of an example system 100 that includes a memory protection unit 102 that provides multiple alternative sets of memory protection attributes. For purposes of example, the memory protection unit 102 is shown in a microcontroller 103 that also includes an execution unit 104 and memory 107. The microcontroller 103 could be, for example, a member of the Atmel AVR32 family of microcontrollers. In other implementations, the memory protection unit could be part of a memory device, a stand-alone controller device, or another device other than a microcontroller. In some implementations, various input/output resources are also provided (not shown in FIG. 1), and can be mapped to addresses within an overall memory map. In such implementations, use of input/output resources can also be controlled by the memory protection unit 102.

Memory 108 is also included in the system 100 and is shown external to the microcontroller 103. In some implementations, the memory 108 is included in the same package as the microcontroller 103. One or more buses 109 can be used for memory and data transfers between the memory 108 and the microcontroller 103. For example, as shown, one bus 109a can be used for instructions and another bus 109b can be used for data.

In the example microcontroller implementation shown in FIG. 1, the execution unit 104 can execute program instructions that are stored in the memory 108. Execution of other program instructions can cause data to be retrieved from the memory 108, manipulated in some manner by the execution unit 104 or stored in the memory 108.

In some implementations, the memory protection unit 102 can be used to control the above-described operations. For example, the memory protection unit 102 can employ memory protection attributes to determine whether program instructions from a particular portion of memory 108 can be executed, or whether data can be read from or written to other portions of memory 108. In addition to controlling read, write or execute-access to portions of memory 108, the memory protection unit 102 can be employed to control whether data or instructions in various portions of memory 108 are bufferable or cacheable. For example, as shown in FIG. 1, the data path can include one or more caches or buffers (e.g., instruction cache 124, data cache 126, instruction buffer 123, data buffer 128) included in memory 107, and the memory protection unit 102 can control whether data or instructions in various portions of memory 108 can be stored in or flow through one of the caches or buffers included in the memory 107.

In some implementations, attributes of different portions of memory 108 can be applied to configurable regions or sub-regions of fixed or variable size that can be configurable through the memory protection unit 102. In particular, for example, the memory protection unit 102 can include registers 110, which can be configured to specify a location for each memory region or sub-region within a device's overall memory map. In some implementations, each region has a start address and size, based on values in a corresponding configuration register. In other implementations, each region has a start address and an ending address, which can be configured through a corresponding register or registers. In some implementations, each region has its own dedicated register or registers that characterize the region within the overall memory map.

Each region can further include sub-regions. In some implementations, a fixed number of sub-regions (e.g., three, four, eight, sixteen or some other number) are evenly distributed within a region, based on the size of the region and the number of sub-regions. In other implementations, a fixed number of sub-regions may be distributed in a different manner. In particular, for example, each region may include some sub-regions of a first size and other sub-regions of a second size. In still other implementations, the number and distribution of sub-regions within a region can also be configurable through values in corresponding registers.

Other registers can store memory protection attributes that are applied to the various regions and sub-regions. For example, one or more registers can store values that specify whether particular regions or sub-regions are accessible for read, write or execution access (e.g., accessibility parameters). One or more other registers can store values that specify whether contents of particular regions or sub-regions can be buffered (e.g., bufferability parameters). One or more other registers can store values that specify whether contents of particular regions or sub-regions can be cached (e.g., cacheability parameters).

Some implementations include multiple alternative sets of registers that define multiple alternative sets of memory protection attributes. For example, in one implementation, as shown, the memory protection unit 102 includes a first set of memory protection attributes (e.g., "A" attributes 130) and a second set of memory attributes (e.g., "B" attributes 132). Each set of memory protection attributes 130 or 132 can include attributes that specify accessibility parameters for each region and sub-region, attributes that specify bufferability parameters for each region and sub-region, and attributes that specify cacheability parameters for each region and sub-region. In some implementations, other memory attributes can be included in each set.

Implementations that include multiple alternative sets of memory protection attributes can include a mechanism for specifying which of the multiple alternative sets of memory protection attributes are to be applied to specific regions or sub-regions. For example, as is described with reference to FIGS. 3, 4 and 6, some implementations include a selection register (or a selection field within a register) for each sub-region of memory, which specifies which of the alternative sets of memory protection attributes are to be applied to the corresponding sub-region. In particular, in some implementations, the memory protection unit includes one selection register for each region of memory, and each selection register includes a field for each sub-region within the region. Each field can store a value that uniquely identifies one of the alternative sets of memory protection attributes.

In some implementations, the memory protection unit 102 can be employed each time a memory access attempt or request is made (e.g., by the execution unit 104 executing program instructions). For example, if the execution unit 104 executes a read instruction directed to a specific address in instruction memory 114, the memory protection unit 102 can identify a configured region and sub-region (e.g., a region or sub-region within the memory map that is characterized by values in the registers 110) that includes the specific address. The memory protection unit 102 can then determine which set of memory protection attributes (e.g., memory protection attributes 130 or 132) are to be applied to the relevant region and sub-region. Based on the appropriate set of memory protection attributes, the memory protection unit 102 can determine whether to allow or inhibit the memory access. In some implementations, the memory protection unit 102 inhibits a memory access by asserting an exception signal 134 that triggers an exception handler 112 within the execution unit 104.

In some implementations, a current mode of the execution unit is relevant in determining whether a memory access is to be permitted. For example, certain regions or sub-regions that are configured to cover the instruction memory 114 may only be accessible to the execution unit 104 when the execution unit is in a supervisory mode (e.g., as it may be when executing operating system instructions). Accordingly, the memory protection unit 102 may receive input from the execution unit 104 that specifies a current mode, which can, in some implementations, be used in conjunction with appropriate memory protection attributes in determining whether a memory access is to be allowed or inhibited.

As shown in FIG. 1, the system 100 can include one or more caches (e.g., the data cache 126 or instruction cache 124) and one or more buffers (e.g., the instruction buffer 123 or the data buffer 128). In one implementation, as shown, the memory protection unit 102 can also control whether data can be stored in or pass through a cache or buffer, or whether data is to bypass a cache and/or buffer.

Some implementations employ caches and buffers to improve performance of a system, for example, where one or more aspects of a memory system are slower than the corresponding execution unit 104. In particular, for example, a fast cache (e.g., data cache 126) can be employed to store a copy of frequently-accessed data that is otherwise stored in a slower memory. As another example, an instruction buffer 123 can be employed to store multiple instructions retrieved from a relatively slow memory device, such as an instruction ROM. In some cases, it can be advantageous to not allow data to be buffered or cached (e.g., for security reasons or to address coherency issues). In such cases, the memory protection unit 102 can be employed to enforce buffer or cache parameters for particular regions or sub-regions of memory.

The example shown in FIG. 1 depicts a Harvard architecture, in which instructions and data have separate data paths. In other implementations, a memory protection unit can be employed within a von Neumann architecture, in which data and instructions travel over the same data path. Moreover, in other implementations, the overall arrangement of components can be different. For example, in some implementations, the memory protection unit 102 can be included within the execution unit 104. Similarly, cache and buffers can be included in the execution unit 104 in some implementations. In other implementations, buffers can be included in individual memory devices. In some implementations, the memory protection unit 102 can be a separate device that is external to the device that includes the execution unit 104. Similarly, in some implementations, cache can be implemented by stand-alone devices, separate from the device that includes the execution unit 104. In general, more than one memory protection unit can be provided. For example, one memory protection unit can be provided for the instruction path of a Harvard architecture-based device, and a second memory protection unit can be provided for the data path of the device. FIG. 1 is a non-limiting example of one architecture, but various other architectures can be employed without departing from the spirit of this document.

The memory system 107 and 108 can include various kinds of memory devices, each of which can be used for different purposes (e.g., instructions, long-term data storage, scratch pad data storage, etc.), and each of which can have different specifications and operating parameters (e.g., width, size, speed, etc.). In particular, the example in FIG. 1 depicts ROM, SRAM, DRAM and EEPROM devices. Other implementations can include different kinds of memory (e.g., NVRAM, Flash, etc.) and different arrangements of the memory.

Figure 2:
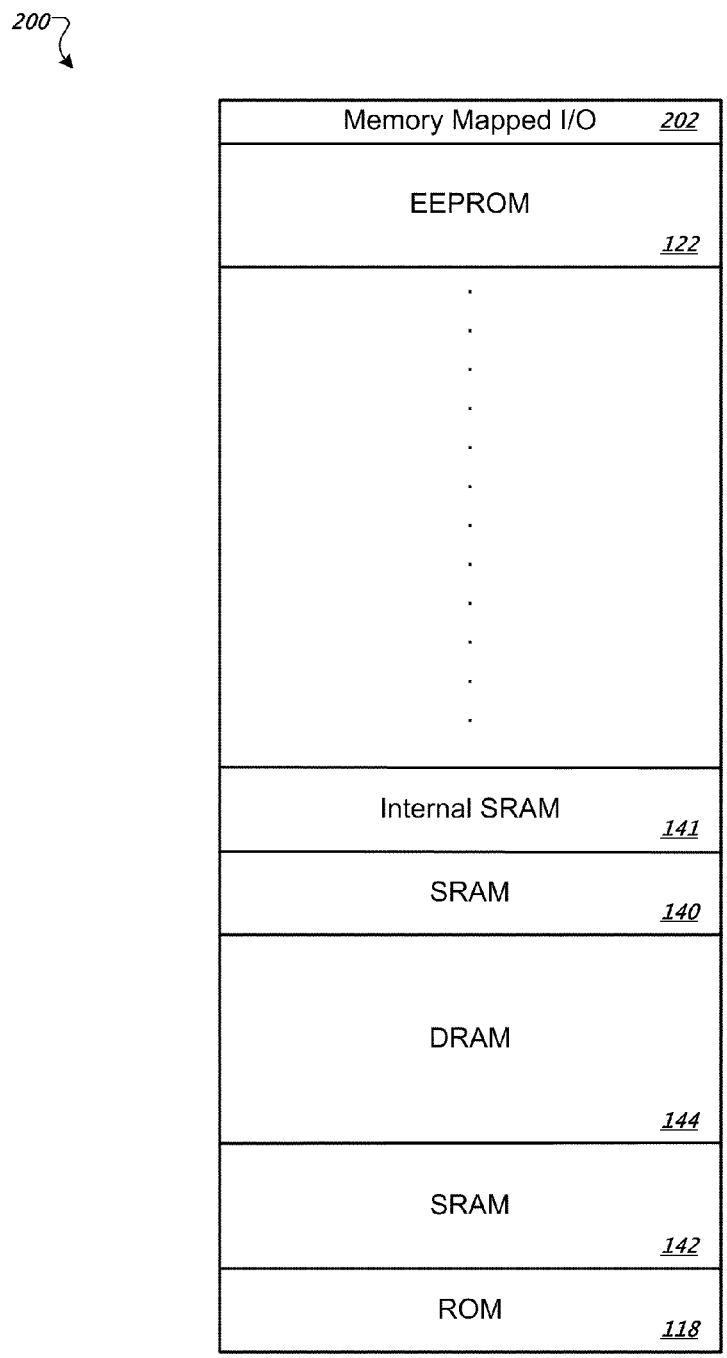
FIG. 2 is an example memory map of memory that can be included in the system of FIG. 1.

FIG. 2 is an example memory map 200 of the memory included in the system 100 shown in FIG. 1. The memory map 200 defines an address space for various memory types, including but not limited to: ROM 118, SRAM 140 and 142, DRAM 144, internal SRAM 141 (e.g., internal registers), EEPROM 122, and memory mapped I/O 202. The memory map 200 can be a map of a flat, unsegmented memory space controlled by memory protection unit 102.

ROM 118 can be included in the instruction memory 114. In some implementations, the ROM 118 includes application program instructions that can be executed by the execution unit 104. SRAM 140 can also be included in instruction memory 114. In some implementations, the SRAM 140 includes application program instructions that may be separately loaded into the instruction memory 114 and used for a debugging mode or other type of special execution mode of the system 100.

SRAM 142, DRAM 144 and EEPROM 122 can be included in the data memory 108. In some implementations, SRAM 142 and DRAM 144 include data values used by application programs executed by the microcontroller 103. In some implementations, EEPROM 122 is used to store configuration values for a microcontroller based system. In other implementations, the EEPROM 122 includes configuration values for peripheral devices included in the microcontroller based system. The use of EEPROM 122 to store configuration values can allow, for example, the values to be customized by a user for each system in which the microcontroller may be included.

Figure 3:
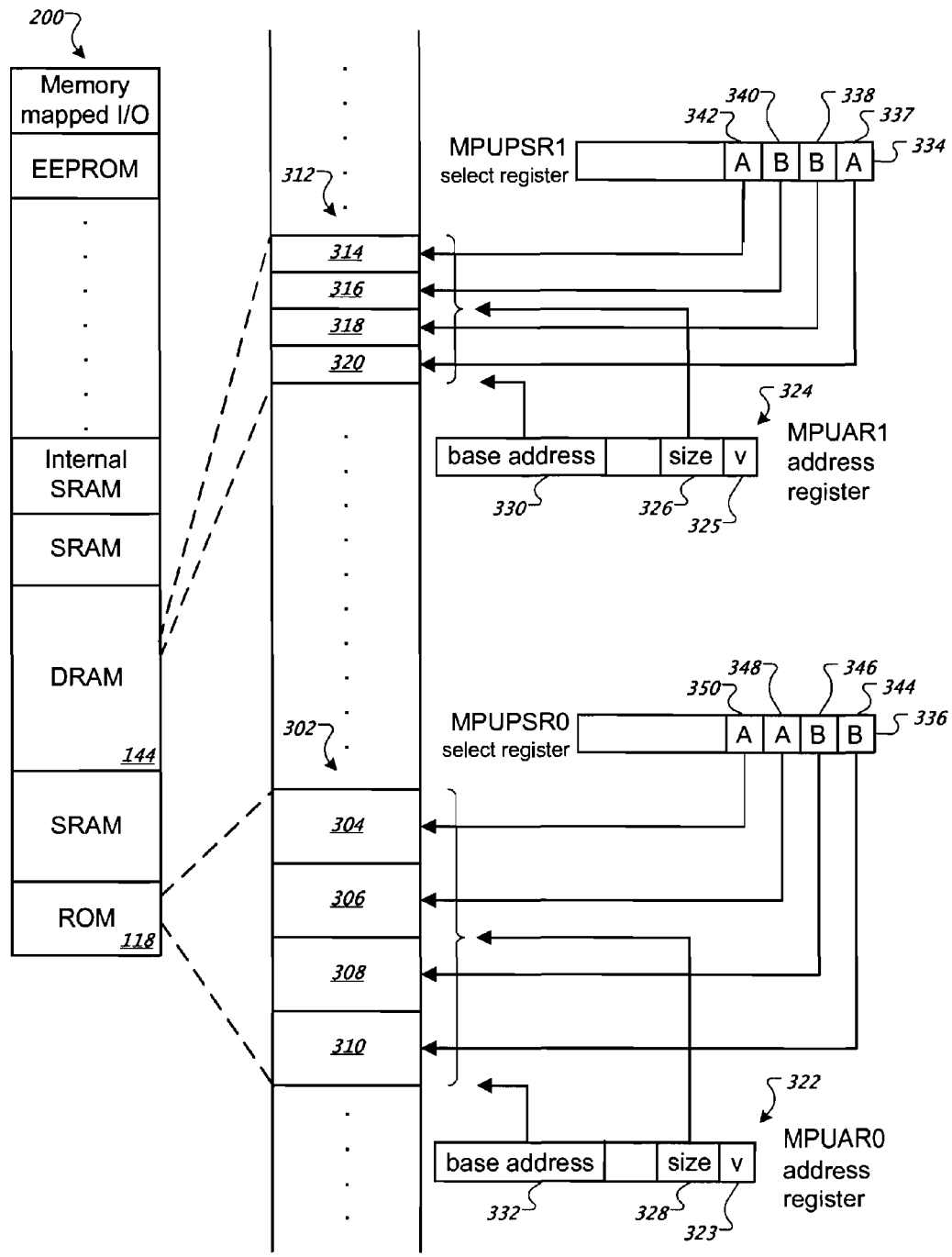
FIG. 3 illustrates an example of dividing memory into regions and sub-regions.

FIG. 3 illustrates an example division of the memory 108 into regions that can include sub-regions, each of which can have different memory protection attributes. In the example of FIG. 3, a protection region 302 can be configured to include a portion of the ROM 118, and the protection region 302 can include sub-regions 304, 306, 308, and 310. A memory protection unit address register 322 (MPUAR0) can be associated with region 302. In one implementation, as shown, the address register 322 can be configured to define the start address and size of the protection region 302. A second, memory protection unit address register 324 (MPUAR1) can define the start address and size of a second protection region 312 that, as shown, includes a portion of the DRAM 144 and has sub-regions 314, 316, 318, and 320.

In alternate implementations, other protection regions can cover other areas of memory shown in the memory map 200. For example, the number of protection regions that can be included in the memory space of a microcontroller (e.g., memory space mapped by the memory map 200) can be specified in a system configuration register or registers (not shown) included in the microcontroller 103. A user may program such configuration register(s) with a selected number of regions. In some implementations, for example, the memory space is divided into eight regions. In alternate implementations, the memory space can be divided into sixteen or some other number of regions. FIG. 3 illustrates two regions in the memory space mapped by memory map 200.

The protection regions can be of different sizes. In the implementation shown in FIG. 3, the size of each region is characterized by a corresponding address register. In particular, for example, the size of region 312 can be specified by size bits 326 in address register 324. Similarly, the size of region 302 can be specified by size bits 328 in address register 322. In some implementations, memory regions can be defined to cover the entire memory map 200. In other implementations, memory regions may be defined that only cover a portion of the memory map 200. In the latter case, where memory regions are only defined for portions of the memory map 200, the memory protection unit 102 can optionally be configured to disable access to memory outside of defined protection regions (e.g., by causing an exception). In other implementations, all memory is accessible, with unprotected regions being directly accessible, while memory protection attributes or protected regions are employed to enforce corresponding protection strategies.

In the implementation shown, the address register associated with each region includes the base address for the start of the protection region in memory. In particular, the start in memory of region 312 is specified by the base address 330 bits in address register 324. Similarly, the start of region 302 is specified by the base address bits 332 in address register 322.

In some implementations, a region can range in size from 4 kBytes to 4 GBytes. The size of the region can be a power of two. The start address of the region (the base address) can be an integer multiple of the region size. For example, if the region is 8 kBytes, the 13 lowest bits of the start address may be implicitly set to zero.

In other implementations, the size of a region can be specified by providing an end address for the region which can be included in an additional address register, for example, that can be associated with the region. In these implementations, the base address need not be an integer multiple of the region size.

In some implementations, each address register also includes a valid bit (e.g., valid bits 323 and 325). The valid bit can specify if the protection region is valid. In some implementations, memory protection attributes are only applied to valid regions. If a region is not valid, no memory accesses may be deemed to map to the region.

As mentioned above, each region can be divided into a number of sub-regions. In the example of FIG. 3, region 312 includes four sub-regions 314, 316, 318, and 320. In other implementations, the number of sub-regions included in a region can be another number that may be a power of two, which may divide the region into equal portions. For example, the size of region 312 is 8 kBytes. Since region 312 includes four sub-regions 314, 316, 318, and 320, each sub-region's size is equal to 2 kBytes in this example. In other implementations, a region can include eight or sixteen sub-regions, or some other number that may or may not be a power of two.

In some implementations, each region has associated with it a select register, whose contents specify which set of multiple alternative sets of memory protection attributes are to be applied to the region or to sub-regions within the region. In the example shown in FIG. 3, region 312 has associated with it memory protection unit permission select register 334 (MPUPSR1) and region 302 has associated with it memory protection unit permission select register 336 (MPUPSR0).

Each select register can be divided into n fields that correspond to n sub-regions of the region, for example, to provide additional granularity in memory attribute configurability. Each field can specify which of multiple alternative sets of memory protection attributes are to be applied to a corresponding sub-region. For example, select register 334 includes four fields—337, 338, 340, and 342—which correspond to sub-regions 320, 318, 316, 314, respectively. In this example, each field specifies whether the "A" alternative set of memory protection attributes are to be applied to the corresponding sub-region, or whether the "B" set of memory protection attributes are to be applied to the corresponding sub-region. In particular, for example, field 337 specifies that "A" attributes are to be applied to sub-region 320; field 338 specifies that "B" attributes are to be applied to sub-region 318; and so on. In implementations in which each region has its own select registers, a specific set of alternative memory protection attributes can be individually assigned to each sub-region, within each region in the memory map, providing in these implementations, considerable flexibility in memory protection.

In some implementations, a select register includes eight fields for eight sub-regions. In other implementations, a select register includes sixteen fields for sixteen sub-regions. In some implementations, each field of the select register can include multiple bits to allow more sets of properties to be supported. For example, if the fields in the register 334 or 336 included two bits, four sets of memory property registers could be supported. In some implementations, additional memory properties can be supported with the inclusion of additional memory property registers for each register set supported by the specific implementation. In the example of FIG. 3, each region is divided into the same number of sub-regions. In other implementations, each region may be divided into a different number of sub-regions.

Figures 4, 5A, 5B:
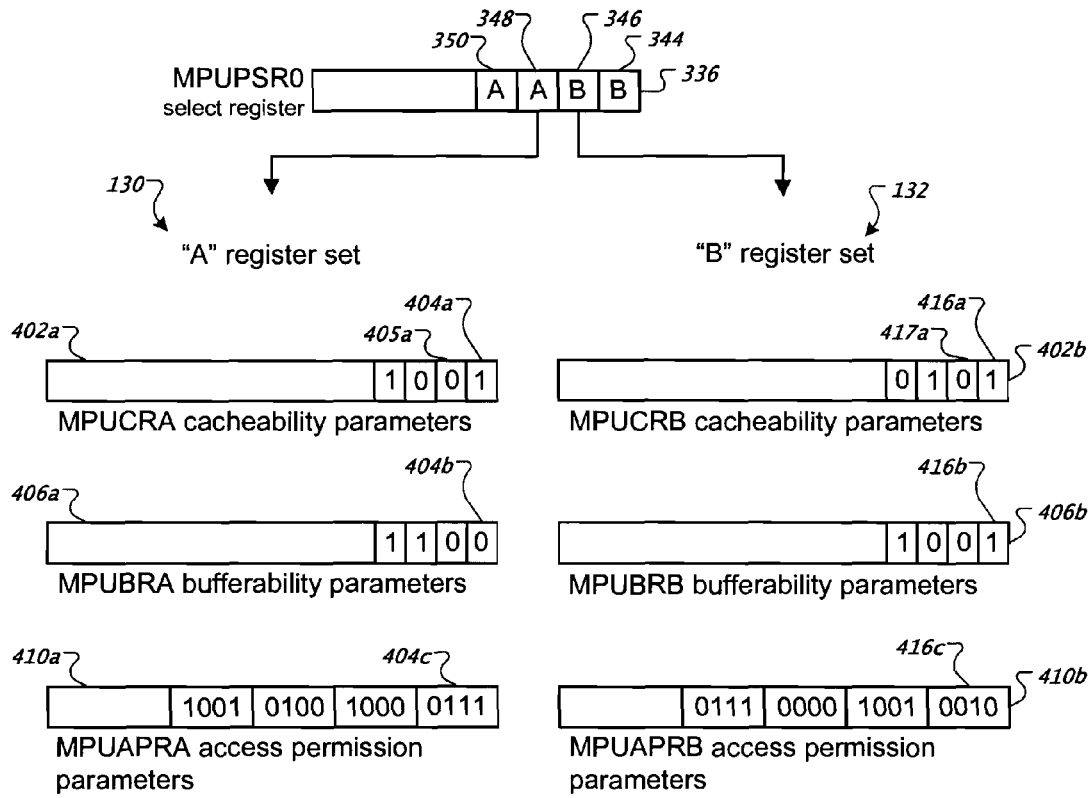
FIG. 4 is a diagram of example registers that can be associated with sub-regions.
FIGS. 5A and 5B are block diagrams of example first and second sets of alternative memory protection attributes.

FIG. 4 is a diagram of example registers that can be associated with the various regions and sub-regions that are shown in FIG. 3. In particular, FIG. 4 illustrates sample memory protection unit cacheability registers 402a (MPUCRA) and 402b (MPUCRB) that can specify alternative cacheability parameters for each region (e.g., fields 404a and 416a can specify alternative cacheability parameters for the first region 302; fields 405a and 417a can specify alternative cacheability parameters for the second region 312; etc.); sample memory protection unit bufferability registers 406a (MPUBRA) and 406b MPUBRB) that can specify alternative bufferability parameters for each region; and sample memory protection unit access permission registers 410a (MPUAPRA) and 410b (MPUAPRB) that can specify alternative access permissions for each region.

In the implementation shown, the sample cacheability register 402a, bufferable register 406a, and the access permission register 410a make up a first set of alternative memory protection parameters (e.g., the "A" register set 130, as shown in FIG. 1). A second alternative set of memory protection parameters (e.g., the "B" register set 132, as shown in FIG. 1) can include a second memory protection unit cacheable register 402b (MPUCRB), a second memory protection unit bufferable register 406b (MPUBRB), and a second memory protection unit access permission register 410b (MPUA-PRB). Additional alternative sets of memory protection attributes can be included but are not shown in FIG. 4.

As described above, a select register (e.g., the select register 336) can be used to select which of the alternative sets of memory protection attributes are to be applied to a specific sub-region within the region corresponding to the select register. As shown, the select register 336 includes four fields: 344, 346, 348, 350—each of which is associated with sub-regions 310, 308, 306, and 304, respectively. In particular, field 348, the third field of select register 336, can specify that memory parameters in the "A" register set 130 are to be applied to the third sub-region 306 of the first region (e.g., rather than memory protection parameters from register set "B"). That is, cacheability parameters from the "A" register set 130 (e.g., from the register 402a), bufferability parameters from the "A" register set 130 (e.g., from the register 406a) and access permission parameters from the "A" register set 130 (e.g., from the register 410a) can be applied to the third sub-region 306 of the first region 302.

In some implementations, as is illustrated in FIG. 4, each of the parameter registers are themselves divided into as many fields as there are regions. The particular field that supplies a memory parameter for a particular region corresponds to the number of the particular region. That is, in a cacheability register having four fields, the third field supplies cacheability parameters for the third region; the second field supplies cacheability parameters for the second region; and so on. In particular, the cacheability register 402a includes four fields, one field for each region. The first field in the cacheability register 402a, field 404a, can specify a first alternative cacheability parameter for region 302. A field 404a value equal to "1" can specify, for example, that, when the "A" set of parameters is selected for a given sub-region, the region 302 (in particular, the corresponding sub-region of region 302) is cacheable. Bufferability register 406a also includes four fields, one field for each region. The first field in the bufferability register 406a, field 404b, can specify a first alternative bufferability parameter of region 302. A field 404b value equal to "0" can specify, for example, that, when the "A" set of parameters is selected for a given sub-region, the region 302 (in particular, the corresponding sub-region of region 302) is not bufferable. Access permission register 410a also includes four fields, one field for each region. The first field in the access permission register 410a, field 404c, can specify a first alternative set of access permissions of region 302. A field 404c value equal to "0100" can specify, for example, that, when the "A" set of parameters is selected for a given sub-region, the region 302 (in particular, the corresponding sub-region of region 302) is read-only.

A second set of alternative memory parameters can be provided by cacheability register 402b, bufferability register 406b and access permission register 410b. In particular, the first fields of these registers, 416a, 416b and 416c, can respectively specify second alternative cacheability, bufferability and access permission parameters for the first region 302. As described above, a field in the first region's select register (e.g., MPUPSR0 336) can select which set of alternative parameters are to be applied to a corresponding sub-region. For example, field 344 specifies that "B" memory parameters (e.g., parameters specified by fields 416a, 416b and 416c) are to be applied to the first sub-region of the first region; as another example, field 348 specifies that "A" memory parameters (e.g., parameters specified by fields 404a, 404b and 404c) are to be applied to the third sub-region of the first region. In various implementations, the above-described arrangement and scheme for decoding memory parameters provides considerable flexibility in configuring memory protection.

In some implementations, the value of an access permission field can specify different access permissions, depending on a privilege mode associated with the execution unit. For example, with reference to the table of example encoded values for other access permission modes, shown below, a value of "0001" can specify read and execute access to a region when the execution unit is in a supervisory mode; but the same value can specify no access if the execution unit is in a normal mode. Other values are provided in the table below as non-limiting examples of various combinations of access permissions that can be stored in the access permission registers 410a and 410b.

| Encoded value | Permission in privileged mode (e.g., supervisory mode) | Permission in non-privileged mode (e.g., normal mode) |
| --- | --- | --- |
| 0000 | Read | None |
| 0001 | Read/Execute | None |
| 0010 | Read/Write | None |
| 0011 | Read/Write/Execute | None |
| 0100 | Read | Read |
| 0101 | Read/Execute | Read/Execute |
| 0110 | Read/Write | Read/Write |
| 0111 | Read/Write/Execute | Read/Write/Execute |
| 1000 | Read/Write | Read |
| 1001 | Read/Write | Read/Execute |
| 1010 | None | None |
| Other | UNDEFINED | UNDEFINED |

FIG. 5A is a diagram of example aggregate memory parameters (e.g., access, bufferability and cacheability parameters) for the "A" register set 130 based on example bit encodings for each field of the corresponding registers. In particular, example parameters that are encoded by the fields of the cacheability register 402a, the bufferable register 406a, and the access permission register 410a are depicted in FIG. 5A. The memory parameters 508, which correspond to the first region 302, are specified in this example by corresponding first fields 404a, 404b and 404c in the cacheability, bufferability and access permission registers, respectively.

FIG. 5B is a diagram of example aggregate memory parameters for the "B" register set 132. In particular, for example, memory parameters 516 are specified by fields 416a, 416b and 416c. These fields also specify memory parameters for the first region 302, but for the "B" register set. Thus, the memory 516 parameters would be active in a sub-region of the first region whose select register field specifies the "B" set of memory parameters (e.g., as depicted in FIG. 4, the first and second sub-regions, as specified by fields 344 and 346).

As described above, each region can have its own select register (such as the select register 336, corresponding to region 0); thus, considerable flexibility is possible within the above-described memory protection scheme. Moreover, some implementations support more than two sets of alternative memory protection parameters (e.g, by increasing the number of bits in various fields of the registers), thereby providing additional flexibility.

Figure 6:
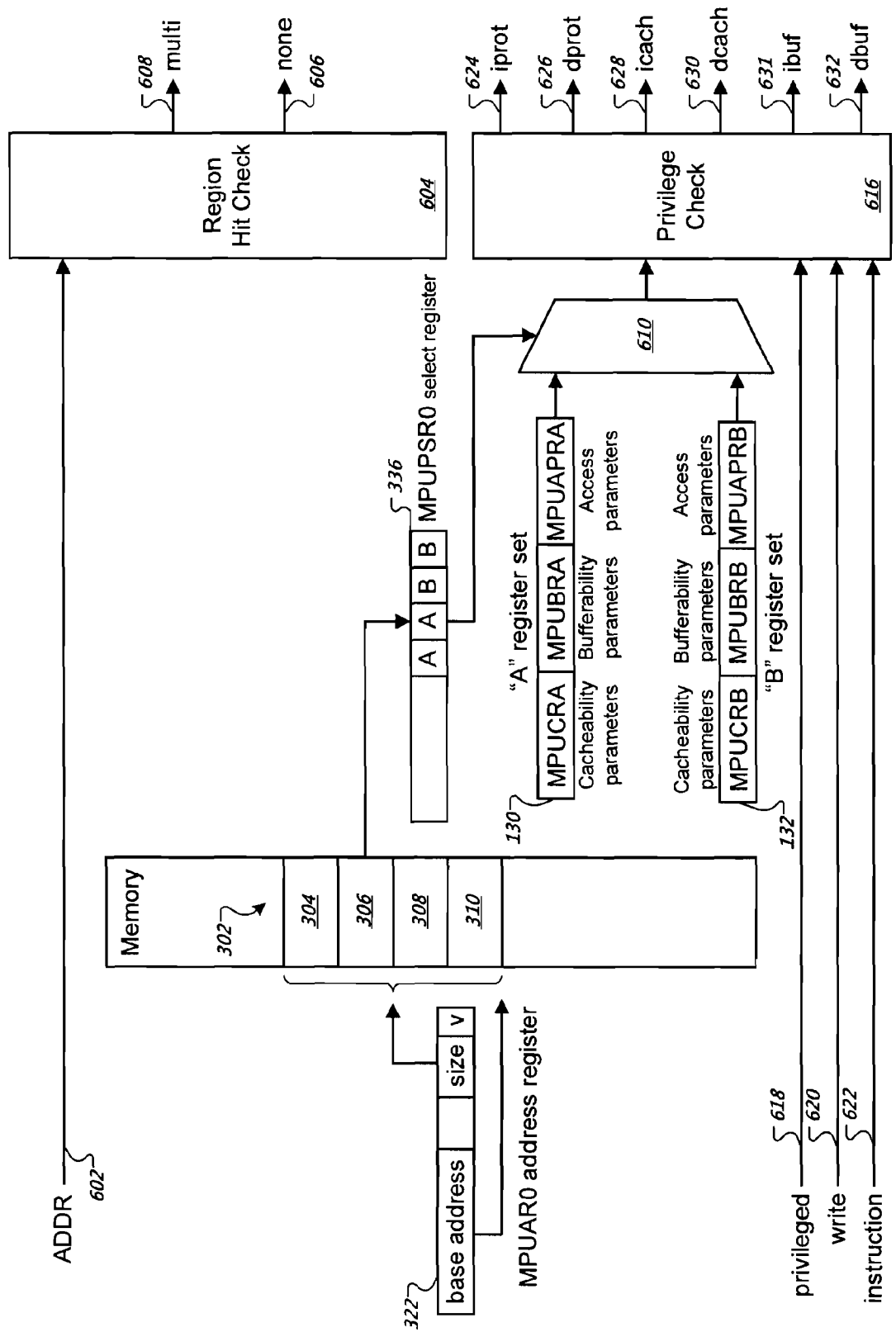
FIG. 6 is a block diagram of an example memory protection unit.

FIG. 6 is a block diagram showing additional details of an example memory protection unit. In some implementations, the execution unit 104, shown in FIG. 1, can generate an address (ADDR 602). A region hit check module 604 can identify the region and sub-region to which the memory access of address ADDR 602 maps. This can be determined, for example, by comparing the address to each of the address registers. More specifically, the address can be compared to a starting address and size in each address register to determine which region the address maps to. Then, based on the size of the region, the number and distribution of sub-regions within the region (e.g., uniform distribution or some other non-uniform distribution), and the difference between the generated address and the region's base address, the region hit check module 604 can identify the sub-region.

In some implementations, if the address maps to multiple regions (e.g., in implementations in which the regions are configured to overlap), a "multi" exception signal 608 can be asserted and the memory access may be aborted or inhibited. In other implementations, a priority scheme can be applied to select one of multiple overlapping regions to which a generated address maps. If the address maps to no region, a "none" exception signal 606 can be asserted, in some implementations, and the memory access may not be performed. In particular, for example, the exception signal can be sent to the exception handler 112 to be handled by the execution unit 104. In other implementations, accesses to memory regions that are not protected may simply be allowed to proceed.

Once the region hit check 604 identifies the region (e.g., region 302) and the sub-region (e.g., sub-region 306) to which the address maps, the memory protection unit 102 can identify and enforce memory protection parameters associated with the identified sub-region. In particular, a select register that corresponds to the identified region (e.g., the first select register, MPUPSR0 336) can be used to identify which of the alternative sets of memory protection attributes are to be applied to the sub-region of memory being accessed. In particular, a field within the select register (e.g., the third field) that corresponds to the position of the identified sub-region (e.g., the third sub-region) can be used to identify which of the alternative sets of memory protection attributes are to be applied. In this example, the third field of the select register 336 (field 348) specifies the "A" set of alternative memory protection attributes (e.g., attributes 508 specified by fields 404*a*, 404*b* and 404*c*). As depicted in one implementation in FIG. 6, this field can be used to control a multiplexer 610 that can route the appropriate set of alternative memory protection attributes to a privilege check module 616.

The privilege check module 616 can apply the alternative memory protection attributes provided to it in order to determine whether to allow or inhibit the memory attempted memory access. For example, the privilege check module 616 can issue various control signals and exception signals to enforce a memory protection scheme. In particular, as one example, the privilege check module 616 can assert an instruction protection exception signal ("iprot" 624) if an attempted access to instruction memory violates the relevant protection scheme, and the privilege check module 616 can assert a similar data protection exception signal ("dprot" 626) if an attempted access to data memory violates the relevant protection scheme. In some implementations, such exception signals can be routed to an exception handler, such as the exception handler 112 that is shown in FIG. 1. As another example, the privilege check module 616 can assert control signals to enable or disable instruction or data caches ("icach" 628 and "dcach" 630, respectively) or to enable or disable instruction or data buffers ("ibuf" 631 and "dbuf" 632, respectively).

In one implementation, as shown, the privilege check module 616 includes additional inputs which can be used in enforcing a memory protection policy. In particular, the privilege check module 616 can receive a signal 618 that indicates whether the execution unit is in a privileged or supervisory mode, a signal 620 that indicates whether the attempted memory access is a write or a read, and a signal 622 that indicates whether memory access is directed to instruction or data memory (e.g., in a Harvard-architecture device).

Only one memory protection "channel" is depicted in FIG. 6, but in some implementations, a memory protection unit can include two or more channels (e.g., one for instruction fetches and one for data access). In some implementations, the channels can be implemented by two separate memory protection units; in other implementations, the two channels can be implemented by a single memory protection unit.

Figure 7:
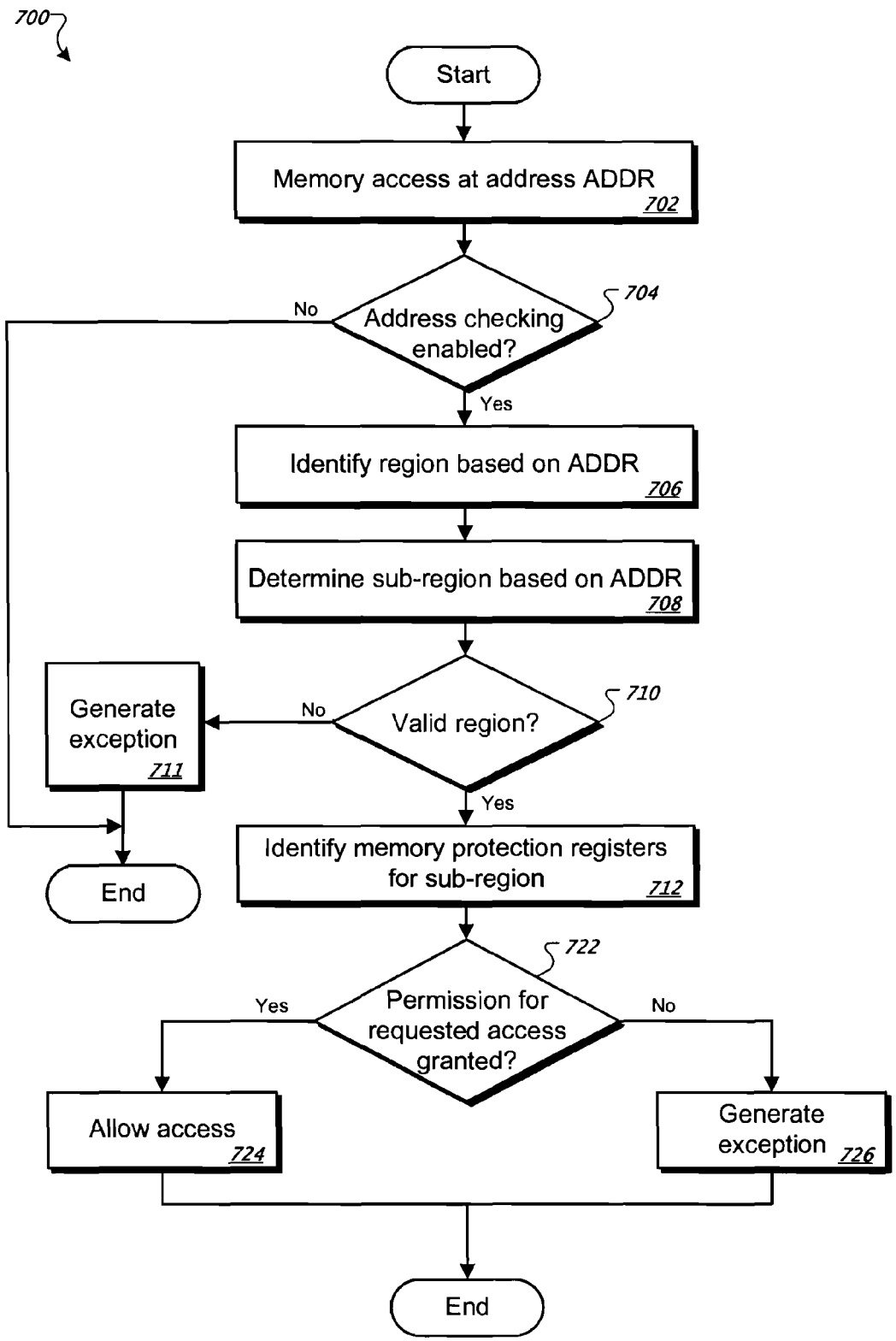
FIG. 7 is a flow diagram of an example method for determining memory parameters for a sub-region in memory.

FIG. 7 is a flow diagram of an example method 700 for enforcing memory protection parameters for a sub-region in memory. The method 700 can start, for example, when the execution unit 104 generates a request for a memory access at a specific address (ADDR) (box 702). In some implementations, a memory protection unit control register (not shown in the previous figures) can be checked to determine whether memory protection is enabled (box 704). If memory protection (e.g., address checking) is disabled, the method 700 can end; and if address checking is enabled, the method 700 continues.

A region in memory can be identified based on the address value, ADDR (box 706). In particular, the region hit check module 604, shown in FIG. 6, can identify which region and sub-region the memory access at ADDR 602 maps to (boxes 706 and 708) using the values in the address registers. In some implementations, the region hit check module 604 can determine, in box 710, if the address maps to a valid region (e.g., to exactly one region, in some implementations). If the address maps to multiple regions or no region, exception signals can be asserted (711) to the exception handler 112, causing, in one implementation as shown, the access to be aborted or inhibiting, and causing the method 700 to end; if the address is valid, the method 700 can continue.

Appropriate memory protection attributes can be identified. In particular, for example, an appropriate set of alternative memory protection attributes can be identified, and specific protection attributes within the set can be obtained (e.g., based on value(s) in an appropriate selection register), and other values in appropriate fields of corresponding cacheability, bufferability and access permission registers can be obtained (box 712). More specifically, as described with reference to FIG. 6, a region to which the address maps can be associated with a select register (e.g., register 336). The field in the select register corresponding to the sub-region to which the address maps can specify the appropriate alternative set of memory parameters (e.g., the "A" register set 130 or the "B" register set 132), from which specific memory properties for the sub-region can be drawn. The memory properties for the sub-region can be provided by fields in the various corresponding memory protection registers (e.g., a cacheability register, a bufferability register and an access permissions register) that correspond to the region.

The privilege check module 616 can then determine (box 722) whether the attempted access is allowed by the implemented memory protection policy. If so, the memory access can be allowed (box 724). If the attempted access is not allowed by the implemented memory protection policy, the memory access can be blocked or inhibited, and the memory protection unit may additionally generate an exception (box 726).

In some implementations, the current microcontroller privilege level is relevant to determining whether an attempted access is allowed. Whether the memory access is an attempted write or an attempted read, and whether the access is directed to instruction or data memory may also be relevant to determining whether an attempted access is allowed. If any of privilege, access type or access target (e.g., data memory or instruction memory) are relevant to a memory protection scheme, this information can also be identified (identification not shown in FIG. 7).

A number of implementations have been described. Nevertheless, it will be understood that various modifications may be made without departing from the spirit and scope of the disclosed implementations. Accordingly, other implementations are within the scope of the following claims.

What is claimed is:

1. A method comprising:
selecting a set of memory protection registers from two or more sets of memory protection registers, the sets of memory protection registers containing memory protection attributes to be applied to a sub-region of memory, where the sub-region of memory is part of a region of memory and less than the entire region of memory, and the region of memory is associated with a selection register having a number of fields associated with a number of sub-regions of memory, and where the selecting is based on contents of a field of the selection register associated with the sub-region and the contents of the field indicate the set of memory protection registers; and
controlling access to the sub-region based on at least one of the memory protection attributes.

2. The method of claim 1, further comprising receiving a signal associated with an attempted access to data that is stored in the sub-region of memory.

3. The method of claim 2, further comprising:
determining the sub-region by associated comparing an address associated with the sub-region to address values stored in one or more address registers.

4. The method of claim 1, wherein the at least one memory protection attribute specifies whether contents of a specific location in memory corresponding to the sub-region, are allowed to be buffered.

5. The method of claim 1, wherein the at least one memory protection attribute specifies whether contents of a specific location in memory corresponding to the sub-region, are to be cacheable.

6. The method of claim 1, wherein the at least one memory protection attribute specifies whether contents of specific location in memory corresponding to the sub-region, are to be accessible to an execution unit in its current mode of operation, wherein the current mode of operation is selected from the group consisting of a non-privileged mode of operation and a privileged mode of operation.

7. The method of claim 6, wherein specifying whether contents of the specific location in memory are to be accessible comprises specifying whether contents of the specific location in memory-can be read from, written to or executed.

8. An embedded device comprising, within a single device package:
an execution unit configurable to execute program instructions;
one or more memories that are configurable to store data and program instructions to be executed by the execution unit; and
a memory protection unit that is configurable for:
selecting a set of memory protection registers from two or more sets of memory protection registers, the sets of memory protection registers containing memory protection attributes to be applied to a sub-region of memory, where the sub-region of memory is part of a region of memory and less than the entire region of memory, and the region of memory is associated with a selection register having a number of fields associated with a number of sub-regions of memory, and where the selecting is based on contents of a field of the selection register associated with the sub-region and the contents of the field indicate the set of memory protection registers; and
controlling access to the sub-region based on at least one of the memory protection attributes.

9. The embedded device of claim 8, wherein controlling access comprises selectively granting or denying a request for access.

10. The embedded device of claim 8, wherein controlling access comprises selectively enabling or disabling buffering of contents of a specific location in memory corresponding to the sub-region.

11. The embedded device of claim 8, wherein controlling access comprises selectively enabling or disabling caching of contents of a specific location in memory corresponding to the sub-region.

12. The embedded device of claim 8, wherein controlling access comprises selectively allowing the execution unit to access a specific location in memory corresponding to the sub-region, or issuing an exception to the execution unit that prevents the execution unit from accessing the specific location in memory.

* * * * *

UNITED STATES PATENT AND TRADEMARK OFFICE
CERTIFICATE OF CORRECTION

| | | |
|---|---|---|
| PATENT NO. | : 8,051,263 B2 | Page 1 of 1 |
| APPLICATION NO. | : 11/744573 | |
| DATED | : November 1, 2011 | |
| INVENTOR(S) | : Erik Knutsen Renno | |

It is certified that error appears in the above-identified patent and that said Letters Patent is hereby corrected as shown below:

In the Claims

1.) Column 13, Claim 3, Line 33: after "sub-region by" delete "associated".

2.) Column 13, Claim 6, Line 45: delete "of specific" and insert --of a specific--.

3.) Column 14, Claim 7, Line 7: delete "memory-can" and insert --memory can--.

Signed and Sealed this
Eleventh Day of February, 2014

Michelle K. Lee
*Deputy Director of the United States Patent and Trademark Office*